US009371015B2

(12) United States Patent
Matsui et al.

(10) Patent No.: US 9,371,015 B2
(45) Date of Patent: Jun. 21, 2016

(54) VEHICLE SEAT

(71) Applicants: TOYOTA BOSHOKU KABUSHIKI KAISHA, Aichi-ken (JP); AISIN SEIKI KABUSHIKI KAISHA, Aichi-ken (JP)

(72) Inventors: Hayato Matsui, Chiryu (JP); Mikihito Nagura, Okazaki (JP); Shinya Isobe, Nagoya (JP)

(73) Assignees: TOYOTA BOSHOKU KABUSHIKI KAISHA, Aichi-Ken; AISIN SEIKI KABUSHIKI KAISHA, Aichi-Ken ( * ) Notice: Subject to any disclaimer, the term of this patent is extended or adjusted under 35 U.S.C. 154(b) by 135 days.

(21) Appl. No.: 14/356,494

(22) PCT Filed: Nov. 5, 2012

(86) PCT No.: PCT/IB2012/002225
§ 371 (c)(1),
(2) Date: May 6, 2014

(87) PCT Pub. No.: WO2013/068803
PCT Pub. Date: May 16, 2013

(65) Prior Publication Data
US 2014/0300166 A1    Oct. 9, 2014

(30) Foreign Application Priority Data

Nov. 7, 2011    (JP) ................. 2011-243313

(51) Int. Cl.
*B60N 2/22* (2006.01)
*B60N 2/235* (2006.01)

(52) U.S. Cl.
CPC ............. *B60N 2/22* (2013.01); *B60N 2/2356* (2013.01); *B60N 2205/50* (2013.01)

(58) Field of Classification Search
CPC ................. B60N 2/22; B60N 2/2356
USPC ..................................... 297/362.12
See application file for complete search history.

(56) References Cited

U.S. PATENT DOCUMENTS

| 2007/0145801 | A1 | 6/2007 | Yamada et al. | |
| 2009/0096269 | A1* | 4/2009 | Kojima | B60N 2/2356 297/362 |
| 2010/0096895 | A1* | 4/2010 | Nonomiya | B60N 2/2356 297/344.15 |

FOREIGN PATENT DOCUMENTS

| CN | 1982118 | 6/2007 |
| CN | 101155713 | 4/2008 |
| CN | 101193770 | 6/2008 |
| CN | 101412381 | 4/2009 |

(Continued)

*Primary Examiner* — Anthony D Barfield
(74) *Attorney, Agent, or Firm* — Greenblum & Bernstein, P.L.C.

(57) ABSTRACT

A reclining device includes an operating shaft that is inserted through the reclining device in its axial direction to be mounted, and is adapted to release the reclining device from a locked position, and a torsion spring mounted between an outer end portion of the operating shaft which protrudes from the reclining device outward in a width direction of the seat, and a frame portion that is located outside the reclining device in the seat width direction. The operating shaft is constantly biased by the torsion spring in a rotational direction for locking the reclining device. The torsion spring is mounted onto the outer end portion of the operating shaft in the axial direction from an outer side of the seat, and has an inner end portion which is engaged with the operating shaft, and an outer end portion which is engaged with the frame portion.

7 Claims, 4 Drawing Sheets

(56) References Cited

FOREIGN PATENT DOCUMENTS

| | | |
|---|---|---|
| CN | 101568447 | 10/2009 |
| EP | 2 050 614 | 4/2009 |
| GB | 2264146 A * | 8/1993 ............... B60N 2/22 |
| JP | 07-016126 | 1/1995 |
| JP | 2007-501036 | 1/2007 |
| JP | 2009-95432 | 5/2009 |
| JP | 2011-116303 | 6/2011 |

* cited by examiner

VEHICLE SEAT

BACKGROUND OF THE INVENTION

1. Field of the Invention

The invention relates to a vehicle seat. More specifically, the invention relates to a vehicle seat in which a seat back is coupled to a seat cushion via a reclining device having a rotation locking function such that the reclining angle of the seat back is adjustable.

2. Description of Related Art

In a known arrangement of a vehicle seat, when a release lever provided on an outer side portion of a seat cushion as viewed in the width direction of the vehicle is pulled up, a seat back is released from a locked position in which the reclining angle is fixed, so that the reclining angle can be adjusted as desired (see Japanese Patent Application Publication No. 2009-95432 (JP 2009-95432 A)). The release lever is integrally joined to an operating shaft operable to release the lock on the seat back, which shaft is inserted through a central portion of a reclining device that couples the seat back with the seat cushion. The release lever is normally biased in a rotational direction for holding the reclining device in the locked position (i.e., in such a direction as to lower the release lever), by means of a torsion spring mounted between an outer end portion of the operating shaft as viewed in the vehicle width direction, and an outer frame portion of the seat cushion as viewed in the vehicle width direction.

However, with the related art described in JP 2009-95432 A as identified above, the torsion spring is likely to be disengaged from the operating shaft of the reclining device, due to displacement of the operating shaft caused by an axial clearance set in the operating shaft.

SUMMARY OF THE INVENTION

The invention provides a vehicle seat in which a torsion spring that applies bias force to an operating shaft of a reclining device in a rotational direction for locking the reclining device is less likely or unlikely to be disengaged from the operating shaft even if the operating shaft is displaced in the axial direction.

A vehicle seat according to one aspect of the invention a seat back, a seat cushion, and a reclining device that includes a rotation locking mechanism, and couples the seat back with the seat cushion such that a reclining angle of the seat back is adjustable. The reclining device includes an operating shaft that is inserted through the reclining device in an axial direction thereof to be mounted, and is adapted to release the reclining device from a locked position, and a torsion spring mounted between an outer end portion of the operating shaft which protrudes from the reclining device outward as viewed in a width direction of the seat, and a frame portion that constitutes the seat back or the seat cushion and is located outside the reclining device as viewed in the width direction of the seat. The operating shaft is constantly biased by the torsion spring in a rotational direction for locking the reclining device. The torsion spring is mounted onto the outer end portion of the operating shaft in the axial direction from an outer side of the seat, to be wound thereon, and has an inner end portion closer to the seat, which is engaged with the operating shaft, and an outer end portion remote from the seat, which is engaged with the frame portion.

According to the above aspect of the invention, even if the operating shaft is displaced inwardly of the seat (in the axial direction), the torsion spring is less likely or unlikely to be disengaged from the operating shaft, due to the presence of the axial lap length between an inner end portion of the torsion spring as viewed in the width direction of the seat and an outer end portion of the operating shaft. Also, the inner and outer end portions of the torsion spring are set or located at the axially opposite positions; therefore, even if the operating shaft is displaced inwardly of the seat (in the axial direction), the torsion spring is deformed to be expanded in the axial direction, and is prevented from being compressed and disengaged from the end portion of the operating shaft. Thus, the torsion spring can be made less likely to be disengaged from the operating shaft even when the operating shaft is displaced due to an axial clearance set in the operating shaft.

In the vehicle seat as described above, the torsion spring may be mounted onto the operating shaft in the axial direction and engaged with the operating shaft such that the inner end portion of the torsion spring is shaped so as to match an angular portion of the operating shaft, the angular portion of the operating shaft having an angular cross-section, and the outer end portion of the torsion spring may be engaged with the frame portion.

With the above arrangement, the torsion spring is mounted or fitted onto the operating shaft in the axial direction, from the outer side of the seat, so that the inner end portion of the torsion spring formed in a shape matching the angular portion of the operating shaft can be engaged with the operating shaft. Also, the axial lap length over which the inner end portion of the torsion spring is engaged with the operating shaft can be easily set to be sufficiently long by extending the angular portion of the operating shaft.

The vehicle seat according to the above aspect of the invention may be constructed as follows. The reclining device is provided between each of right and left side portions of the seat back and each of right and left side portions of the seat cushion. The operating shaft is provided in each of the reclining devices, and the operating shafts of the reclining devices are connected to each other via a rod so as to rotate as a unit. An operating lever used for releasing each of the reclining devices from a locked position is connected to one of the operating shafts. The torsion spring is provided between the outer end portion of each of the operating shafts as viewed in the width direction of the seat and a corresponding one of the frame portions, for engagement therewith, independently of a lock spring provided in each of the reclining devices for biasing each operating shaft in a rotational direction to lock the operating shaft. The torsion spring functions as a biasing member for suppressing displacement of the operating lever at an initial position thereof due to a play that is set for the initial position of the operating lever before being operated.

With the above arrangement in which the reclining devices and the operating shafts are provided on the opposite (right and left) side portions of the seat, each of the torsion springs is less likely or unlikely to be disengaged from the corresponding operating shaft even when the operating shafts assembled together via the rod in the axial direction are displaced in the axial direction due to axial clearances for use in assembling. By providing the torsion springs on both of the right and left side portions, it is possible to apply bias forces for suppressing displacement of the operating lever when it is at the initial position, to the right- and left-side reclining devices, while balancing the bias forces with each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings.

Figure 1:
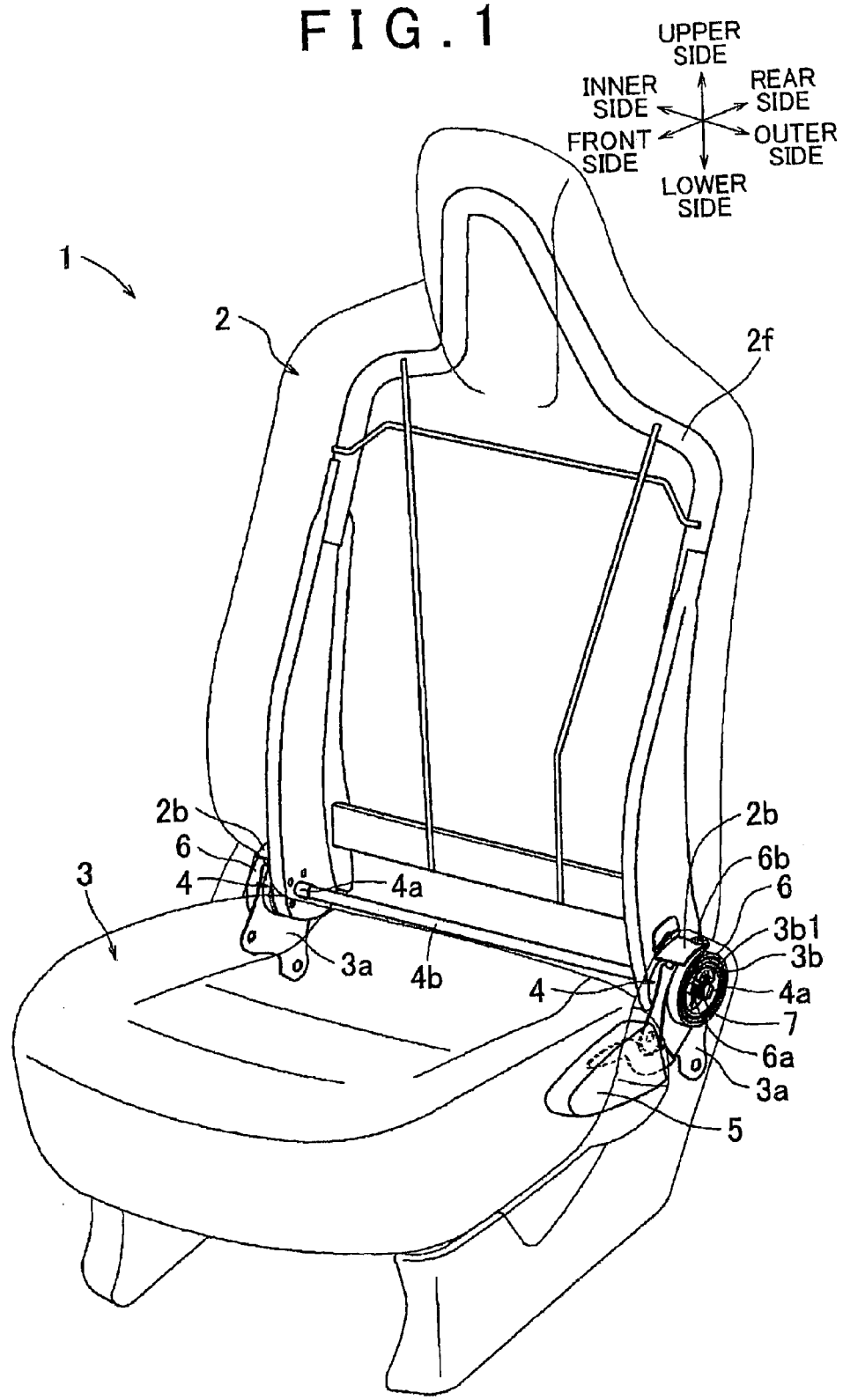
FIG. 1 is a perspective view schematically showing the construction of a vehicle seat according to one embodiment of the invention.

Initially, the construction of a vehicle seat 1 according to a first embodiment of the invention will be described with reference to FIG. 1 through FIG. 4. As shown in FIG. 1, the vehicle seat 1 of this embodiment is constructed as a passenger seat of an automobile, and has a seat back 2 that serves as a backrest for a seated passenger, and a seat cushion 3 that serves as a seating portion. Right and left lower end portions of the seat back 2 are respectively coupled with right and left rear end portions of the seat cushion 3 installed on the floor of the vehicle, via reclining devices 4 interposed therebetween. The reclining device 4 functions as a pivotal device capable of inhibiting rotation of the seat back 2 relative to the seat cushion 3.

More specifically, the reclining devices 4 are interposed between right and left lower end portions of a seat back frame 2a that forms a framework of the seat back 2, and right and left rear end portions of a seat cushion frame 3a that forms a framework of the seat cushion 3, respectively, and couple the seat back frame 2a with the seat cushion frame 3a such that these frames 2a, 3a are rotatable relative to each other about the same axis. With this arrangement, the seat back 2 is coupled to the seat cushion 3 such that the reclining angle of the seat back 2 can be adjusted in the longitudinal direction of the seat. A locking structure provided within each of the reclining devices 4 is operable to switch the reclining device 4 between a condition (unlocked position) in which the reclining angle of the seat back 2 can be changed, and a locked condition or position.

More specifically, operating shafts 4a are inserted through central portions of the reclining devices 4, and each of the reclining devices 4 is arranged to be switched between the locked position and the unlocked position, in accordance with rotation of a corresponding one of the operating shafts 4a about its axis. The operating shafts 4a are connected to each other via a rod 4b, whereby switching operations of the right and left reclining devices 4 between the locked and unlocked positions are performed at the same time in synchronism with each other.

Each of the reclining devices 4 is normally held in the locked operating condition in which the reclining angle of the seat back 2 is fixed, by means of a spring biasing structure (which will be described later). A release lever 5 is provided on one side portion of the seat cushion 3 corresponding to the outer side (the right-hand side on the paper of FIG. 1) as viewed in the vehicle width direction. When the release lever 5 is pulled up, the operating shafts 4a are rotated about their axes at the same time, and the reclining devices 4 are released from the locked positions in which the reclining angle of the seat back 2 is fixed. During the releasing operation, the reclining angle of the seat back 2 can be freely adjusted. When the releasing operation is stopped, i.e., when the release lever 5 is released, the reclining devices 4 are brought back into the locked conditions in which the reclining angle of the seat back 2 is fixed, by means of the respective spring biasing structures.

Figure 2:
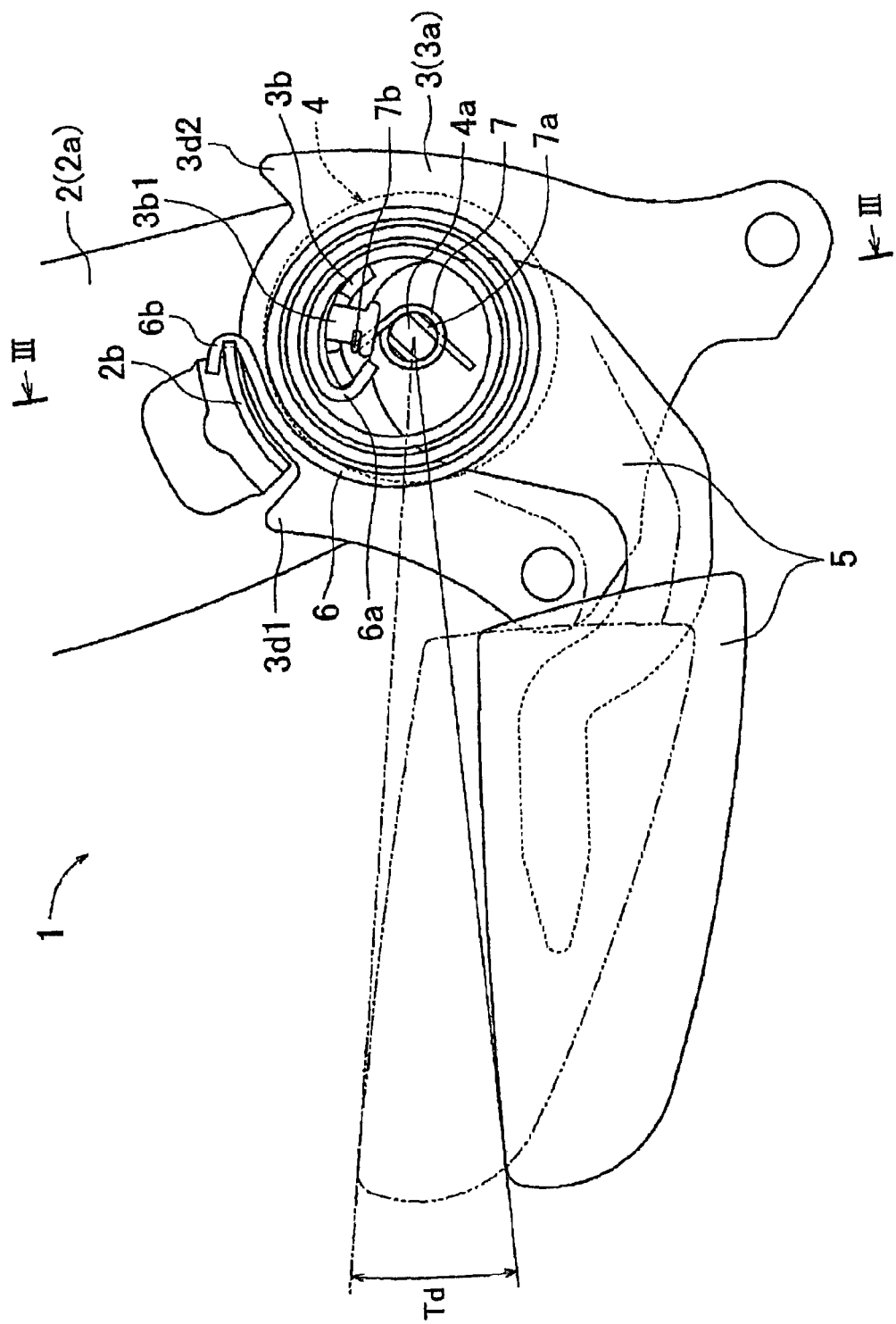
FIG. 2 is a side view of the vehicle seat.

Spiral springs 6 that constantly bias the seat back 2 forward of the seat are respectively mounted between the right and left side portions of the seat back frame 2a and the right and left side portions of the seat cushion frame 3a. As shown in FIG. 2, an inner end portion 6a of each of the spiral springs 6 is engaged with and fixed to a front edge portion of an outwardly projecting plate portion of an L-shaped plate 3b joined to each of the right and left side portions of the seat cushion frame 3a, and an outer end portion 6b of each spiral spring 6 is engaged with and fixed to a rear edge portion of an outwardly projecting plate portion of an L-shaped plate 2b joined to each of the right and left side portions of the seat back frame 2a.

When the reclining devices 4 are released from the locked positions in which the reclining angle of the seat back 2 is fixed, the seat back 2 is tilted or rotated to a position at which the seat back 2 touches the back of a seated passenger, under the bias force of the spiral springs 6, and follows the movement of the back of the seated passenger who tilts his/her upper body back and forth so that the reclining angle can be freely varied. The seat back 2 is rotatable within a region between a position at which front edge portions of the L-shaped plates 2b of the seat back frame 2a abut on forward-tilt stoppers 3d1 that protrude from front portions of the seat cushion frame 3a, and a position at which rear edge portions of the L-shaped plates 2b of the seat back frame 2a abut on rearward-tilt stoppers 3d2 that protrude from rear portions of the seat cushion frame 3a.

Figure 3:
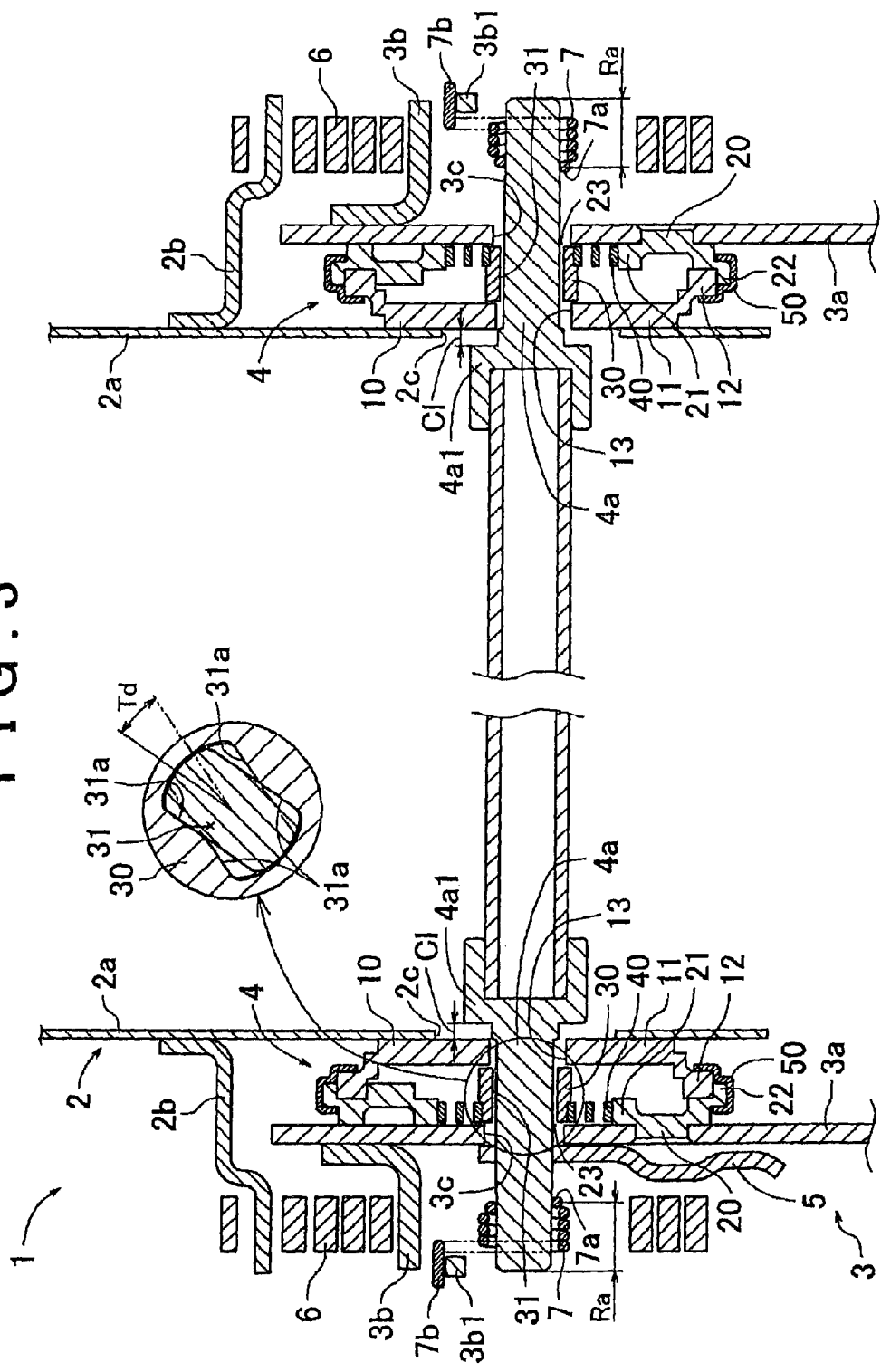
FIG. 3 is a cross-sectional view taken along line in FIG. 2.

As shown in FIG. 3, each of the reclining devices 4 as described above has disc-shaped ratchet 10 and guide 20, a lock component (not shown) mounted between the ratchet 10 and the guide 20, a hinge cam 30 that places the lock component in a locking position or an unlocking position, a lock spring 40 that constantly urges the hinge cam 30 to rotate in a locking direction, and an outer peripheral ring 50 that holds the ratchet 10 and the guide 20 in an assembled condition. The ratchet 10 has a disc portion 11, and a cylindrical portion 12 formed at the outer periphery of the disc portion 11 to protrude in a cylindrical shape in a thickness direction (axial direction) thereof. A round through-hole 13 is formed in the thickness direction through a central portion of the ratchet 10. The guide 20 is formed in the shape of a disc having a larger diameter than the ratchet 10, and has a disc portion 21, and a cylindrical portion 22 formed at the outer periphery of the disc portion 21 to protrude in a cylindrical shape in a thickness direction (axial direction) thereof in which the guide 20 is mounted onto the ratchet 10. A round through-hole 23 is also formed in the thickness direction through a central portion of the guide 20.

The ratchet 10 and the guide 20 are assembled together with their cylindrical portions 12, 22 engaged with each other in the axial direction, so that the cylindrical portions 12, 22 are loosely fitted on each other so as to support each other in radial directions such that they are rotatable relative to each other. The outer peripheral ring 50 is mounted on outer peripheral portions of the ratchet 10 and guide 20 thus assembled together, so that the ratchet 10 and the guide 20 are held in a condition in which they are prevented from being disengaged from each other in the axial direction. The ratchet 10 is mounted to the seat back frame 2a such that a part of an outer flat surface of the ratchet 10 is integrally joined to a part of an outer flat surface of the seat back frame 2a, and the guide 20 is mounted to the seat cushion frame 3a such that a part of an outer flat surface of the guide 20 is integrally joined to a part of an inner flat surface of the seat cushion frame 3a. With this arrangement, each of the reclining devices 4 connects each side portion of the seat back frame 2a with a corresponding side portion of the seat cushion frame 3a, to thus support the frames 2a, 3a such that they are rotatable about the same axis.

The above-mentioned lock component (not shown) is provided between the ratchet 10 and the guide 20 for inhibiting or allowing relative rotation thereof. More specifically, the lock component is supported in a circumferential direction such that it can only move radially outward and inward, relative to the guide 20. When the hinge cam 30 rotatably supported in the central portion of the guide 20 rotates in one direction or the other direction, the rock component is operated to be pushed radially outward, to be pressed against and engaged with an inner circumferential surface (toothed face) of the cylindrical portion 12 of the ratchet 10, or operated to be pulled back radially inward, to be disengaged from the cylindrical portion 12 of the ratchet 10.

When the lock component is engaged with the inner circumferential surface of the cylindrical portion 12 of the ratchet 10 due to rotation of the hinge cam 30, the reclining device 4 is placed in the locked position in which the ratchet 10 and the guide 20 are inhibited from rotating relative to each other. Namely, the lock component is supported in the circumferential direction such that it can only move radially outward and inward, in relation to the guide 20; thus, when the lock component and the ratchet 10 engage or mesh with each other so that they can rotate as a unit, the ratchet 10 and the guide 20 are brought into a locked condition in which they are inhibited from rotating relative to each other, via the lock component.

The above-described hinge cam 30, a part of which is inserted in the through-hole 23 of the guide 20, is supported such that it is rotatable relative to the guide 20. The hinge cam 30 is constantly held biased in one rotational direction, under bias force of the lock spring 40 mounted between the hinge cam 30 and the guide 20. With the hinge cam 30 rotated under the bias force of the lock spring 40, the lock component is pushed radially outward, to be placed in a condition for holding the reclining device 4 in the locked position.

The above-mentioned operating shaft 4a is inserted through a central portion of the hinge cam 30. When the release lever 5 is pulled up, the operating shaft 4a is rotated in a direction against the bias force of the lock spring 40, so that the hinge cam 30 disengages the lock component (not shown) from the ratchet 10, and releases the reclining device 4 from the locked condition. In this connection, each of the operating shafts 4a is inserted in the axial direction through a central portion of the corresponding reclining device 4, from each side portion of the seat back frame 2a located inside the seat, outwardly of the seat. More specifically, the operating shaft 4a is inserted through a through-hole 2c formed in the seat back frame 2a, through-hole 13 formed in the central portion of the ratchet 10 of the reclining device 4, through-hole 31 of the hinge cam 30 (through-hole 23 of the guide 20), and a through-hole 3c formed in the seat cushion frame 3a, to protrude outwardly of the seat.

Each of the operating shafts 4a has a cylindrical head portion 4a1 formed in an inner end portion thereof which is located inside the seat. The head portion 4a1 has a larger diameter than the remaining portion of the operating shaft 4a. Each end portion of the rod 4b is fitted in and integrally joined to the head portion 4a1 of the corresponding operating shaft 4a. Thus, the operating shafts 4a on both sides of the seat are connected to each other via the rod 4b, so as to rotate integrally with each other or as a unit. Each operating shaft 4a, which has the large-diameter head portion 4a1, is prevented from being pulled off from the corresponding reclining device 4, outwardly of the seat. A frame of the release lever 5 is integrally joined by welding to a portion of one of the operating shafts 4a located on the outer side of the vehicle (left-hand side in FIG. 3), which portion protrudes outwardly of the seat from the seat cushion frame 3a.

When the release lever 5 is pulled up, the operating shafts 4a are rotated at the same time in the direction against the bias force of the lock springs 40 of the reclining devices 4, so that the reclining devices 4 are released from the locked positions at the same time. When the release lever 5 stops being pulled up, the operating shafts 4a rotate, along with the hinge cams 30, in the locking direction under the bias force of the lock springs 40 of the reclining devices 4, so that the reclining devices 4 are brought back into the locked positions at the same time.

Each of the operating shafts 4a is coupled with the corresponding hinge cam 30 such that the operating shaft 4a can freely rotate alone, from a condition in which the hinge cam 30 is rotated to the position where the reclining device 4 is locked, further in the same direction by a given amount represented by a play (or clearance) angle Td. As shown in FIG. 2, the play angle Td is set so that the operating shaft 4a is inhibited from rotating even if the release lever 5 is pulled up by a given amount from the initial position, for enhancement of an operational feeling. More specifically, as shown in FIG. 3, the operating shaft 4a has a generally rectangular shape in cross-section, while the through-hole 31 of the hinge cam 30 is shaped like a butterfly so as to permit the operating shaft 41 to freely rotate within a given angular range, and the play angle Td is set as an angular range over which the operating shaft 4a can freely rotate until it abuts on corresponding ones of side walls 31a of the through-hole 31 of the hinge cam 30.

With the play angle Td set as described above, when the release lever 5 is in the initial position before it is operated (i.e., pulled up), the bias force of the lock spring 40 that urges the reclining device 4 to rotate toward the locked position acts as force that is exclusively applied to the hinge cam 30 so as to rotate it to the locked position and hold it in this position, while the operating shaft 4a and the release lever 5 are in a condition (fluttering condition) in which they can freely rotate within the set range of the play angle Td, relative to the hinge cam 30 held at the locked position. In view of this situation, a torsion spring 7 for forcing the operating shaft 4a and the release lever 5 to be held at their initial positions is mounted between the operating shaft 4a and the seat cushion frame 3a, so as to prevent the operating shaft 4a and the release lever 5 from fluttering at the initial positions.

The torsion spring 7 is mounted onto each of the operating shafts 4a in the axial direction, from the outer side of the seat as viewed in the width direction, such that the torsion spring 7 is wound on the operating shaft 4a. More specifically, the operating shaft 4a is initially inserted through an inner end portion 7a of the torsion spring 7 as viewed in the width direction of the seat. The inner end portion 7a located closest to the seat is formed in a bent shape that matches an angular portion of the operating shaft 4a. The angular portion of the operating shaft 4a has the angular (rectangular) cross-section. With the operating shaft 4a thus inserted through the torsion spring 7, the inner end portion 7a is engaged with the operating shaft 4a such that the torsion spring 7 and the operating shaft 4a can rotate as a unit or integrally (see FIG. 2). After the inner end portion 7a is engaged with the operating shaft 4a, an outer end portion 7b of the torsion spring 7, which is wound outwardly of the seat, is engaged with and fixed on a front edge portion of each spring piece 3b1 that is bent downward from the distal end of the L-shaped plate 3b joined to each outer side portion of the seat cushion frame 3a as described above. The spring piece 3b1 functions as the "frame portion" of the invention.

With the torsion springs 7 thus mounted on the respective operating shafts 4a, spring biasing force is uniformly applied to the right and left operating shafts 4a, and the release lever 5, which receives the uniform spring biasing force, is held at the initial position without being fluttered. Since the biasing direction of each torsion spring 7 is the same as the biasing direction of the lock spring 40 of each reclining device 4 as described above in FIG. 3, the torsion spring 7 also functions as a biasing member that applies bias force to the hinge cam 30 via the corresponding operating shaft 4a, in such a direction as to rotate the hinge cam 30 toward the locked position.

Figure 4:
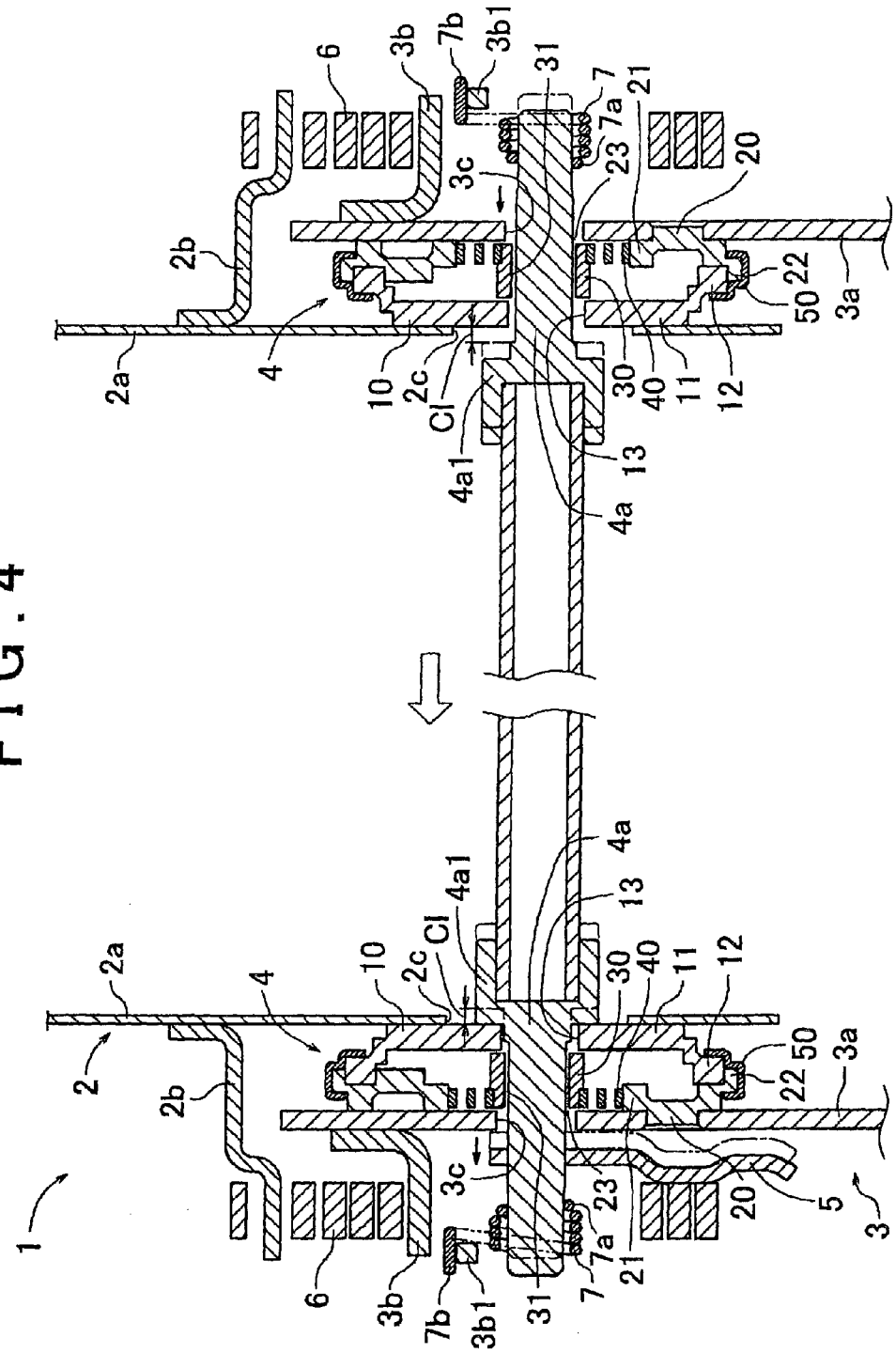
FIG. 4 is a cross-sectional view showing a condition in which an operating shaft moves in the axial direction.

In the meantime, the operating shafts 4a are assembled together via the rod 4b in the axial direction; therefore, a clearance C1 for assuring the ease or efficiency of assembling in the axial direction is provided between the head portion 4a1 of each operating shaft 4a and a side face of the ratchet 10 of the reclining device 4 on each side. Thus, the integral structure of the operating shafts 4a and the rod 4b becomes shaky in the axial direction within the range of the clearance C1 (see FIG. 4). Due to the axial displacement of the assembly of the operating shafts 4a and the rod 4b, each torsion spring 7 mounted on the outer end portion of the corresponding operating shaft 4a may be slipped out of the operating shaft 4a and fall off. For example, if the operating shafts 4a are displaced or moved to the left as seen in FIG. 4, the right-side torsion spring 7 as seen in FIG. 4 may be slipped out of the operating shaft 4a and fall off. If displacement occurs in the reverse direction, the left-side torsion spring 7 may be slipped out of the operating shaft 4a and fall off.

In this embodiment, however, each of the torsion springs 7 is axially mounted onto and wound on an end portion of the corresponding operating shaft 4a which protrudes outwardly of the seat, from the outer side of the seat, such that the inner end portion 7a closer to the seat is engaged with the operating shaft 4a, and the outer end portion 7b remote from the seat is engaged with the corresponding spring piece 3b1 joined to the seat cushion frame 3a. With this arrangement, even if the operating shaft 4a on which the torsion spring 7 is mounted is displaced toward the inside of the seat (in the axial direction), the torsion spring 7 is less likely or unlikely to be disengaged from the operating shaft 4a, due to the presence of the axial lap length Ra between the inner end portion 7a and the outer end portion of the operating shaft 4a. Also, each torsion spring 7 is shaped such that the inner end portion 7a and the outer end portion 7b are positioned at the axially opposite positions; therefore, even if the operating shaft 4a on which the torsion spring 7 is mounted is displaced toward the inside of the seat (in the axial direction), the torsion spring 7 is deformed, i.e., expanded in the axial direction (see FIG. 4), and is prevented from being compressed and detached from an end portion of the operating shaft 4a. Thus, even if the assembly of the operating shafts 4a and the rod 4b becomes shaky due to the axial clearance C1 provided for each operating shaft 4a, the torsion springs 7 are less likely or unlikely to be disengaged from the operating shafts 4a.

With the arrangement of this embodiment, each torsion spring 7 is mounted on the corresponding operating shaft 4a in the axial direction from the outer side of the seat, so that the inner end portion 7a of the torsion spring 7 closer to the seat can be engaged with the operating shaft 4a with its shape matching the angular portion of the operating shaft 4a. Thus, the torsion spring 7 can be easily engaged with the operating shaft 4a. Also, the axial lap length Ra as measured from the inner end portion 7a to the corresponding end of the operating shaft 4a, over which the torsion spring 7 is engaged with the operating shaft 4a, can be easily set to be long by extending the angular portion of the operating shaft 4a in the axial direction. The detailed arrangement of each reclining device 4 is substantially identical with that of the reclining device as disclosed in Japanese Patent Application Publication No. 2011-116303 (JP 2011-116303 A), and therefore, will not be specifically described.

While one embodiment of the present invention has been described above, the invention may be embodied in various forms other than the illustrated embodiment. While the seat back 2 is coupled to the seat cushion 3 via the reclining device 4 in the illustrated embodiment, the arrangement called "seat cushion" represents a base member fixed to the floor, and may include a vehicle body structure, or a structure as a part of the vehicle body.

While the ratchet 10 is coupled to the seat back frame 2a, and the guide 20 is coupled to the seat cushion frame 3a in the illustrated embodiment, the ratchet 10 may be mounted to the seat cushion frame 3a, and the guide 20 may be mounted to the seat back frame 2a. Also, the present invention may be applied to an arrangement in which the reclining device is provided only on one side of the seat, in a coupling portion of the seat back and the seat cushion. Also, the torsion spring may be mounted between the operating shaft and the frame portion of the seat back. Also, the torsion spring may be used (as a lock spring) for constantly placing the operating shaft in the position for locking the reclining device.

What is claimed is:

1. A vehicle seat comprising:
    a seat back;
    a seat cushion; and
    a reclining device that includes a rotation locking mechanism, and couples the seat back with the seat cushion such that a reclining angle of the seat back is adjustable,
    wherein the reclining device comprises:
        an operating shaft that is inserted through the reclining device in an axial direction thereof to be mounted, and is adapted to release the reclining device from a locked position; and
        a torsion spring mounted between an outer end portion of the operating shaft which protrudes from the reclining device outward as viewed in a width direction of the seat, and a frame portion that constitutes at least one of the seat back and the seat cushion and is located outside the reclining device as viewed in the width direction of the seat, wherein
    the operating shaft is constantly biased by the torsion spring in a rotational direction for locking the reclining device,
    the torsion spring is mounted onto the outer end portion of the operating shaft in the axial direction from an outer side of the seat, to be wound thereon, and has an inner end portion closer to the seat and an outer end portion remote from the seat, the inner end portion of the torsion spring being engaged with the operating shaft, and
    the outer end portion of the torsion spring being engaged with the frame portion such that upon a displacement of the outer end portion of the operating shaft away from the seat in the axial direction, the frame portion deforms the torsion spring towards the seat in the axial direction.

2. The vehicle seat according to claim 1, wherein the torsion spring is mounted onto the operating shaft in the axial direction and engaged with the operating shaft such that the inner end portion of the torsion spring is shaped so as to match an angular portion of the operating shaft, the angular portion of the operating shaft having an angular cross-section, and the outer end portion of the torsion spring is engaged with the frame portion.

3. The vehicle seat according to claim 1, wherein the reclining device further comprises at least two reclining devices, one of the at least two reclining devices is provided between a right side portion of the seat back and a right side portion of the seat cushion, and another of the at least two reclining devices is provided between a left side portion of the seat back and a left side portion of the seat cushion, the operating shafts of the reclining devices being connected to each other via a rod so as to rotate as a unit, an operating lever used for releasing each of the reclining devices from a locked position being connected to one of the operating shafts, and the torsion spring is provided between the outer end portion of each of the operating shafts as viewed in the width direction of the seat and a corresponding one of the frame portions, for engagement therewith, independently of a lock spring provided in each of the reclining devices for biasing said each operating shaft in a rotational direction to lock the operating shaft, the torsion spring functioning as a biasing member for suppressing displacement of the operating lever at an initial position thereof due to a play that is set for the initial position of the operating lever before being operated.

4. The vehicle seat according to claim 2, wherein the reclining device further comprises at least two reclining devices, one of the at least two reclining devices is provided between a right side portion of the seat back and a right side portion of the seat cushion, and another of the at least two reclining devices is provided between a left side portion of the seat back and a left side portion of the seat cushion, the operating shafts of the reclining devices being connected to each other via a rod so as to rotate as a unit, an operating lever used for releasing each of the reclining devices from a locked position being connected to one of the operating shafts, and the torsion spring is provided between the outer end portion of each of the operating shafts as viewed in the width direction of the seat and a corresponding one of the frame portions, for engagement therewith, independently of a lock spring provided in each of the reclining devices for biasing said each operating shaft in a rotational direction to lock the operating shaft, the torsion spring functioning as a biasing member for suppressing displacement of the operating lever at an initial position thereof due to a play that is set for the initial position of the operating lever before being operated.

5. The vehicle seat according to claim 1, wherein a bottom portion of the outer end portion of the torsion spring engages with a top portion of the frame portion.

6. The vehicle seat according to claim 1, wherein the coil from which the outer end portion of the torsion spring extends is a distal-most coil of the torsion spring located farther from the seat than any of the other coils that define the torsion spring.

7. The vehicle seat according to claim 1, wherein the outer end portion of the torsion spring extends from a coil located axially opposite from a coil defining the inner end portion of the torsion spring.

* * * * *